United States Patent Office 3,112,318
Patented Nov. 26, 1963

3,112,318
METHOD FOR PRODUCING PIPERAZINE
Russell C. Lemon, Scott Depot, and Richard C. Myerly, Dunbar, W. Va., assignors to Union Carbide Corporation, a corporation of New York
No Drawing. Filed Oct. 9, 1957, Ser. No. 689,046
1 Claim. (Cl. 260—268)

This invention relates to the production of piperazine from monoethanolamine. More specifically this invention relates to the production of piperazine by the conversion of monoethanolamine in the liquid phase in the presence of ammonia and a metal hydrogenation catalyst at elevated temperatures and pressures.

Piperazine is a valuable intermediate for the manufacture of certain pharmaceuticals and is widely utilized as an anthelmintic in livestock. Many other uses are known but the high price of this material discourages its use. All of the known processes for the production of piperazine require expensive raw materials, involve difficult recovery operations, give low efficiencies, or have high processing costs associated with the production of the piperazine.

One of the less expensive raw materials for the manufacture of piperazine is monoethanolamine and there are known processes for the conversion of this material to piperazine. For example, monoethanolamine hydrobromide or hydrochloride when heated to 250° C. for short periods of time gives fair yields of piperazine. However, while this reaction is simple and gives fair yield it has a number of serious disadvantages. The reaction mixture is extremely corrosive and requires expensive equipment for its production. In addition, recovery of piperazine from the crude product is difficult because of the high solubility of piperazine in water and the acidic reaction product must be neutralized forming large quantities of salt, making impractical the use of a distillation to recover the piperazine.

Applicants have found that monoethanolamine can be reacted in the liquid phase in the presence of ammonia and a metal hydrogenation catalyst at high temperatures and pressures to produce piperazine and valuable byproducts such as ethylenediamine and N-2-aminoethylpiperazine. The invention may be practiced by a batchwise conversion in an autoclave or continuously in other suitable equipment such as a tubular type continuous reactor. By this process the piperazine is recovered in high purity by separation of the gross crude product after filtration to remove suspended catalyst. The reaction is performed in one step and the piperazine is easily recovered by simple means. Further, corrosion of equipment by the reaction mixture is no problem and therefore no special materials of construction are required.

The general procedure for practicing applicants' process is to charge the monoethanolamine and metal hydrogenation catalyst to an autoclave or other suitable equipment. The free space in the autoclave is purged of oxygen with a gas such as hydrogen or nitrogen and the required amount of ammonia is charged. The autoclave is then closed, heated to reaction temperature, and maintained at reaction conditions for the desired time. The pressure during the reaction rises to 1000 or more p.s.i.g. After cooling the autoclave and venting to atmospheric pressure, the liquid product is discharged and filtered to remove the catalyst. The products are recovered by standard procedure known to those skilled in the art, and these methods could include fractional distillation, extraction, extractive distillation, precipitation, or combinations of two or more of these operations.

The temperature of the reaction may vary between about 150–300° C. Temperatures higher than 275° C. can lead to rapid deterioration of the catalyst, whereas temperatures less than 225° C. give slow production rates. The reaction time may vary from about 1 to 10 hours. Reaction time of 2 to 6 hours are preferred. Reaction times of less than 2 hours give somewhat decreased yields. Reaction times longer than 6 or 10 hours are beneficial but only small increases in yield are produced. The pressure may vary from about 1000 to 6000 p.s.i.g.

The presence of ammonia in the reaction system has a significant effect on the yields or piperazine, serving to decrease the yield of by-products. The major effect of ammonia addition is to suppress the deamination of monoethanolamine and piperazine. The yield of piperazine increases as the mol ratio of ammonia to monoethanolamine increases. There is no upper limit to this ratio except that of economic consideration as long as some monoethanolamine is present. Thus the mol ratio of ammonia to monoethanolamine may range from about 0.1:1 to 1:0.1.

In applicants' preferred form of the invention hydrogen is added to the reaction mixture and the ammonia is in the anhydrous condition. Both the anhydrous ammonia and hydrogen are conducive to higher yields.

The effects of the mol ratio of hydrogen to monoethanolamine and pressure are closely interrelated. An interaction exists which makes it preferable to operate at higher pressures at low mol ratios of hydrogen to monoethanolamine and at low pressures at high molar ratios. For example, when the mol ratio of hydrogen to monoethanolamine is 0:15:1 a pressure of about 4,000 p.s.i.g. is desirable for maximum yield, whereas at a ratio of 0.8:1 a pressure of somewhat less than 3,000 p.s.i.g. is desirable. For effective and satisfactory operation the pressure may vary between 1000 p.s.i.g. to 6000 p.s.i.g. When the pressure is 1000 p.s.i.g. the mol ratio of hydrogen to monoethanolamine should be about 20:1 whereas when the pressure is 6000 the mol ratio of hydrogen to monoethanolamine should be about 0.1:1. At a mol ratio of hydrogen to monoethanolamine of about 0.2 to 1, and at an operating pressure of 4,000 pounds, piperazine was obtained in 35% yields.

The concentration of the hydrogenation catalyst may vary from 0.1 to 10%, by weight, of the total reaction mixture. The preferred range is 1.5 to 5% by weight. Yields of piperazine obtained with catalyst concentrations less than 1.5% were quite low, whereas the use of catalyst concentrations above 5% are not economical. At concentrations of 1.5 to 3% of catalyst, yields of piperazine between 16 and 36% were obtained. Any metallic hydrogenation catalyst may be used such as Raney nickel, platinum on alumina, cobalt oxide on kieselguhr and copper chromite. The preferred catalyst is Raney nickel.

The preferred conditions for operation of the reaction are listed below.

| | |
|---|---|
| Temperature in degress centigrade | 200–275. |
| Pressure in pounds per square inch gauge | 2,000–6,000. |
| Catalyst | Raney nickel catalyst 1.5–5 percent by weight based on the weight of monoethanolamine. |
| Molar ratio of: | |
| Ammonia to monoethanolamine | 0.5:1 to 5:1. |
| Hydrogen to monoethanolamine | 0.1:1 to 2:1. |
| Reaction time, in hours | 2 to 6. |

At the above conditions the yield of piperazine is 16.1 to 35.8 percent by weight of the charge of monoethanolamine.

Yields of piperazine in the range of 30 to 36%, by weight of the monoethanolamine may be obtained under the following conditions: Monoethanolamine, anhydrous ammonia, hydrogen, and Raney nickel are heated to a reaction temperature of 240–260° C. for two to six hours at a pressure of 3,000 to 4,200 p.s.i.g., with the molar ratios of monoethanolamine to ammonia of 1:1 to 1:2; a molar ratio of the amine to hydrogen of 1:0.1 to 1:1; and a catalyst concentration of about 3 to 4 weight percent based upon the monoethanolamine.

The following examples are illustrative of the invention.

*Example 1*

To a high pressure autoclave of three-liter capacity, were charged 611 grams (10 moles) of monoethanolamine and 26 grams of Raney nickel catalyst. The free space in the autoclave was purged of air with hydrogen, and 255 grams (15 moles) of anhydrous ammonia was added to the autoclave. The autoclave pressure was raised to 1,500 p.s.i.g. with hydrogen which corresponds to the addition of 8.2 moles of hydrogen. The autoclave was closed and heated to 250° C. This temperature was maintained for four hours. During this time, the maximum pressure in the reactor was 3,600 p.s.i.g., decreasing to 3,350 p.s.i.g. at the end of the reaction time. After cooling and discharging, the product was filtered to remove the catalyst and then distilled. Ethylenediamine, piperazine, and N-2-aminoethylpiperazine were obtained in amounts equivalent to yields, based on the monoethanolamine charge, of 4.8, 35.8 and 14.1 percent and efficiencies of 6.2, 38.0, and 15.1 percent, respectively. Unreacted monoethanolamine was recovered in an amount equal to 6.7 percent by weight of the monoethanolamine charge.

*Example 2*

This example shows the conversion of monoethanolamine to piperazine at 275° C.

Monoethanolamine, 978 grams (16 moles), anhydrous ammonia, 272 grams (16 moles), and Raney nickel catalyst, 40 grams, were charged to the autoclave described in Example 1. Hydrogen was added to the autoclave to a total pressure of 1500 p.s.i.g. which corresponds to 6.6 moles of hydrogen. The autoclave was heated to 275° C. and maintained for four hours. The pressure in the autoclave reached a maximum of 4190 p.s.i.g. at the end of the reaction. Amounts of piperazine, ethylenediamine and N-aminoethylpiperazine were obtained equivalent to a yield of 24.2, 2.1, and 16.1 percent respectively, based on the charge of monoethanolamine. No unreacted monoethanolamine was recovered.

*Example 3*

This example shows the conversion of monoethanolamine to piperazine at 225° C.

This example was performed in the same manner as Example 2, except that the reaction temperature was 225° C. The yield of the products was 6.7, 23.7 and 9.0 percent respectively, for ethylenediamine, piperazine and N-aminoethylpiperazine.

*Examples 4, 5 and 6*

The following three examples were run in the same manner as Example 2, except that the reaction temperature was 250° C., and the reaction time was varied:

| Example No. | Reaction time, hours | Yield of piperazine, percent of theory |
|---|---|---|
| 4 | 2 | 28.7 |
| 5 | 4 | 32.1 |
| 6 | 6 | 35.0 |

Examples 4, 5 and 6 show that increased reaction time is beneficial to higher yields of the piperazine.

*Examples 7, 8 and 9*

These examples were run in the same manner as Example 2, except that the ratio of ammonia to monoethanolamine was changed in each run, while the reaction temperature was held constant at 250° C.

| Example No. | Mole ratio of ammonia to monoethanolamine | Yield of piperazine, percent of theory |
|---|---|---|
| 7 | 0:5:1 | 23.1 |
| 8 | 1:0:1 | 32.1 |
| 9 | 1:5:1 | 35.8 |

The above examples show that increasing the mol ratio of ammonia to monoethanolamine gives increased yields of piperazine.

*Example 10*

This example shows the conversion of monoethanolamine to piperazine in the absence of hydrogen.

Monoethanolamine 978 (16 moles), anhydrous ammonia, 272 grams (16 moles) and Raney nickel catalyst, 40 grams, were charged to a high pressure autoclave. The autoclave was closed and heated to 250° C. and maintained for four hours. The initial pressure in the autoclave was zero p.s.i.g. and reached a maximum of 2,660 p.s.i.g. at the end of the reaction. A yield of 9% piperazine, based on the charge of monoethanolamine was obtained.

*Example 11*

This example shows the effect of high molar ratios of hydrogen.

Monoethanolamine, 306 grams (5 moles), anhydrous ammonia, 85 grams (5 moles), and 10 grams of Raney nickel catalyst were charged to the autoclave described in Example 1. Hydrogen was added to a pressure of 1500 p.s.i.g. which corresponds to the addition of 10.6 moles of hydrogen. The reaction was run for four hours, during which time the pressure reached 3410 pounds p.s.i.g. A yield of only 18.4 percent piperazine, based on the monoethanolamine, was obtained.

*Example 12*

This example shows the use of hydrogen within the preferred ratio.

Monoethanolamine, 1270 grams (20.8 moles), anhydrous ammonia, 354 grams (20.8 moles), and Raney nickel catalyst, 49 grams, were charged to the autoclave. Hydrogen was added to a pressure of 1000 p.s.i.g., which corresponds roughly to the addition of 4.4 moles of hydrogen. The reaction was run for four hours, during which time the pressure reached a maximum of 3470 p.s.i.g. A yield of piperazine equivalent to 30.2 percent by weight, based on monoethanolamine, was obtained.

Example 13

This example shows the effect of low pressure on the yield of piperazine.

Monoethanolamine, 978 grams (16 moles), anhydrous ammonia, 272 grams (16 moles), and Raney nickel catalyst, 40 grams, were charged to the autoclave. Hydrogen was admitted to a pressure of 500 p.s.i.g., an amount corresponding to about 2.2 moles. The reaction mixture was heated for four hours, during which time the pressure reached a maximum of 2410 p.s.i.g. An amount of piperazine corresponding to a yield of only 16.1 percent was obtained in this example.

Examples 14, 15, 16 and 17

These examples show that metallic hydrogenation catalysts are generally operable in applicants' process. The general procedure in these examples was that described in Example 2, except that the reaction temperature was 250° C. and the concentration of catalyst in each example was 5 percent by weight. The pressure drop was somewhat different in each case, reflecting variation in conversion at a constant reaction time.

| Example No. | Catalyst | Yield of piperazine, percent |
|---|---|---|
| 14 | Platinum on alumina (5 weight percent contained platinum). | 14.8 |
| 15 | Palladium on alumina (5 weight percent contained palladium). | 8.0 |
| 16 | Cobalt oxide on kieselguhr (60 weight percent cobalt as cobalt oxide). | 12.3 |
| 17 | Copper chromite (essentially pure copper chromite). | 14.6 |

Examples 18, 19 and 20

These examples show the deleterious effect of the addition of water to the reaction.

Reaction conditions:
  Temperature, ° C _____ 250.
  Reaction time, hours _____ 4.
  Initial hydrogen pressure, p.s.i.g. _____ 1500.
  Mole ratio of ammonia to monoethanolamine _____ 1.5:1.
  Catalyst _____ Raney nickel, 3 percent.

| EXAMPLE | 18 | 19 | 20 |
|---|---|---|---|
| Water added, percent of charge | None | 26.5 | [1] 43.1 |
| Final pressure, p.s.i.g | 3,600 | 3,750 | 3,240 |
| Mol ratio of hydrogen to monoethanolamine | 0.81:1 | 0.81:1 | 0.88:1 |
| Yield, %: | | | |
|   Ethylenediamine | 5.8 | 9.2 | 2.8 |
|   Piperazine | 35.8 | 29.0 | 20.8 |
|   Triethylenediamine | 0.3 | Nil | Nil |
|   Aminoethylpiperazine | 14.1 | 20.0 | 2.3 |

[1] Aqueous 28% ammonia used.

What is claimed is:

In the process for producing piperazine from monoethanolamine and ammonia the improvement which comprises reacting monoethanolamine, anhydrous ammonia, and hydrogen in the presence of a catalytic quantity of Raney nickel for a reaction period of 2 to 6 hours at a temperature of 240° C. to 260° C. and at a pressure of 3,000 to 4,200 pounds per square inch gauge and wherein the molar ratio of ammonia to monoethanolamine is be-between 1 and 2 moles of ammonia per mole of monoethanolamine and the molar ratio of hydrogen to monoethanolamine is between 0.1 and 1 mole of hydrogen per mole of monoethanolamine.

References Cited in the file of this patent

UNITED STATES PATENTS

| | | |
|---|---|---|
| 2,519,560 | Fowler | Aug. 22, 1950 |
| 2,754,330 | Shreyer | July 10, 1956 |
| 2,861,995 | MacKenzie | Nov. 25, 1958 |
| 3,037,023 | Moss et al. | May 29, 1962 |

OTHER REFERENCES

Fieser et al.: Organic Chemistry, second edition (1950), pages 66–68, 83, 101–108, 179, 227.